(12) United States Patent
Han et al.

(10) Patent No.: US 12,096,108 B2
(45) Date of Patent: *Sep. 17, 2024

(54) CAMERA MODULE FOR VEHICLE

(71) Applicant: LG INNOTEK CO., LTD., Seoul (KR)

(72) Inventors: Sangyeal Han, Seoul (KR); Bumsig Cho, Seoul (KR); Daeseung Kim, Seoul (KR); Seungho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,938

(22) Filed: Oct. 4, 2022

(65) Prior Publication Data
US 2023/0024856 A1 Jan. 26, 2023

Related U.S. Application Data

(63) Continuation of application No. 16/922,284, filed on Jul. 7, 2020, now Pat. No. 11,496,659, which is a (Continued)

(30) Foreign Application Priority Data

Nov. 8, 2011 (KR) .......................... 10-2011-0115998

(51) Int. Cl.
*H04N 23/57* (2023.01)
*B60R 11/04* (2006.01)
(Continued)

(52) U.S. Cl.
CPC ............. *H04N 23/57* (2023.01); *B60R 11/04* (2013.01); *H04N 23/54* (2023.01); *H04N 23/51* (2023.01)

(58) Field of Classification Search
CPC ........ H04N 23/57; H04N 23/54; H04N 23/51; H04N 23/50; H04N 23/00; B60R 11/04
See application file for complete search history.

(56) References Cited

U.S. PATENT DOCUMENTS

| 3,066,367 A | 12/1962 | Garman |
| 4,008,938 A | 2/1977 | Anhalt et al. |
| (Continued) | | |

FOREIGN PATENT DOCUMENTS

| CN | 1873528 A | 12/2006 |
| CN | 100537302 C | 9/2009 |
| (Continued) | | |

OTHER PUBLICATIONS

International Search Report in International Application No. PCT/KR2012/005018, filed Jun. 26, 2012.
(Continued)

*Primary Examiner* — Joseph W Becker
(74) *Attorney, Agent, or Firm* — Saliwanchik, Lloyd & Eisenschenk

(57) ABSTRACT

A camera module for a vehicle according to the present invention includes a first Printed Circuit Board (PCB) configured to have an image sensor mounted on its surface; a second PCB configured to supply a power source to the first PCB; an outer shield installed to surround the side of the first and the second PCBs and to shield the first and the second PCBs from electromagnetic interference (EMI); and a plurality of support units disposed at positions where the supports units interfere with the first and the second PCBs of the outer shield and configured to support the first and the second PCBs.

11 Claims, 3 Drawing Sheets

Related U.S. Application Data continuation of application No. 16/042,665, filed on Jul. 23, 2018, now Pat. No. 10,750,066, which is a continuation of application No. 14/357,110, filed as application No. PCT/KR2012/005018 on Jun. 26, 2012, now Pat. No. 10,057,467.

(51) Int. Cl.
*H04N 23/54* (2023.01)
*H04N 23/51* (2023.01)

(56) References Cited

U.S. PATENT DOCUMENTS

| | | |
|---|---|---|
| 7,223,125 B2 | 5/2007 | Chen |
| 8,982,273 B2 | 3/2015 | Bingle et al. |
| 9,736,347 B2 | 8/2017 | Han et al. |
| 10,057,467 B2 | 8/2018 | Han et al. |
| 10,750,066 B2 | 8/2020 | Han et al. |
| 2004/0130656 A1 | 7/2004 | Why |
| 2006/0189183 A1 | 8/2006 | Yang |
| 2007/0252910 A1* | 11/2007 | Gottwald ............... H04N 23/50 348/E5.025 |
| 2008/0024883 A1 | 1/2008 | Iwasaki |
| 2011/0134303 A1 | 6/2011 | Jung et al. |
| 2015/0189137 A1 | 7/2015 | Han et al. |

FOREIGN PATENT DOCUMENTS

| | | |
|---|---|---|
| CN | 102088547 A | 6/2011 |
| CN | 102096219 A | 6/2011 |
| CN | 201936054 U | 8/2011 |
| JP | H06132447 A | 5/1994 |
| JP | 2008-035215 A | 2/2008 |
| JP | 2008-270106 A | 11/2008 |
| JP | 2011-139305 A | 7/2011 |
| KR | 10-2006-0125569 A | 12/2006 |
| KR | 10-2006-0125570 A | 12/2006 |
| KR | 10-0876109 B1 | 12/2008 |
| KR | 10-2010-0112810 A | 10/2010 |
| WO | 2008/099784 A1 | 8/2008 |

OTHER PUBLICATIONS

Partial European Search Report in European Application No. 12846979.8.
Office Action dated Sep. 25, 2015 in Chinese Application No. 201280054997.8.
Notice of Allowance dated Apr. 11, 2017 in U.S. Appl. No. 14/644,898.
Office Action dated Jul. 3, 2018 in Chinese Application No. 201610411093.6.
Office Action dated Jul. 18, 2018 in Chinese Application No. 201610410855.0.
Office Action dated Jun. 13, 2018 in European Application No. 18153800.0.
Office Action dated Sep. 20, 2019 in U.S. Appl. No. 16/042,665.
Notice of Allowance dated Apr. 7, 2020 in U.S. Appl. No. 16/042,665.
Office Action dated Oct. 28, 2021 in U.S. Appl. No. 16/922,284.
Notice of Allowance dated Jul. 5, 2022 in U.S. Appl. No. 16/922,284.

* cited by examiner

CAMERA MODULE FOR VEHICLE

CROSS-REFERENCE TO RELATED APPLICATIONS

This application is a continuation of U.S. application Ser. No. 16/922,284, filed Jul. 7, 2020; which is a continuation of U.S. application Ser. No. 16/042,665, filed Jul. 23, 2018, now U.S. Pat. No. 10,750,066, issued Aug. 18, 2020; which is a continuation of U.S. application Ser. No. 14/357,110, filed May 8, 2014, now U.S. Pat. No. 10,057,467, issued Aug. 21, 2018; which is the U.S. national stage application of International Patent Application No. PCT/KR2012/005018, filed Jun. 26, 2012; which claims the benefit under 35 U.S.C. § 119 of Korean Patent Application No. 10-2011-0115998, filed Nov. 8, 2011, which are all hereby incorporated by reference in their entirety including any tables, figures, or drawings.

TECHNICAL FIELD

The present invention relates to a camera module used in a vehicle.

BACKGROUND ART

A camera module for capturing an image is recently being used a lot under the influence of a high degree and automation of vehicle parts. A typical example is front and rear monitoring cameras and a camera module used in a black box, etc.

As an example of this camera module for a vehicle, Korean Patent Laid-Open Publication No. 2006-0125570 (Dec. 6, 2006) discloses a camera structure mounted on a vehicle, including a camera unit configured to capture images around a vehicle and a connector unit connected and fixed to the camera unit and configured to supply a power source and to transmit and receive data.

The camera unit constructed in the prior art document uses a plurality of screws in order to fix a sensor Printed Circuit Board (PCB) on which an image sensor is mounted and a power PCB for supplying a power source to a housing.

If the sensor and the power PCB are combined using the screws as described above, the time taken to perform an assembly process is increased and the optical axis of a lens may be twisted because of rotation moment resulting from force applied to fasten the screws when the optical axis is adjusted.

Furthermore, the area on which the parts of the PCB s are mounted may be limited because screw holes must be formed in each of the PCB s in order to combine the sensor and the power PCB.

Furthermore, additional spacers for spacing must be installed in the sensor and the PCBs because a specific interval needs to be maintained in order to exclude interference between heat-dissipation and mounting devices. Accordingly, ground processing must be additionally performed because the spacers interfere with each of the PCBs.

DISCLOSURE

Technical Problem

An object of the present invention is to provide a camera module for a vehicle having an improved structure, which is capable of fixing and supporting plural sheets of PCBs at once with the PCBs spaced apart from each other even without additional spacers and screws.

Technical Solution

A camera module for a vehicle according to the present invention includes a first Printed Circuit Board (PCB) configured to have an image sensor mounted on its surface; a second PCB configured to supply a power source to the first PCB; an outer shield installed to surround the side of the first and the second PCBs and to shield the first and the second PCBs from electromagnetic interference (EMI); and a plurality of support units disposed at positions where the supports units interfere with the first and the second PCB s of the outer shield and configured to support the first and the second PCBs.

It is preferred that each of the support units include a through hole formed to penetrate the outer shield, formed in the surface of a wall of the outer shield, and configured to accommodate a support protrusion protruded from the side of the first and the second PCBs; and a tension spring formed by partially bending the sidewall face of the outer shield and configured to support a face where the tension spring faces the support protrusion of the through hole.

Furthermore, it is preferred that each of pairs of the support units be symmetrically disposed on the sidewall face of the outer shield up and down and configured to support the first and the second PCBs simultaneously.

Here, it is preferred that the support protrusion include a ground terminal unit plated with conductive material and formed at a position where the support protrusion interferes with the tension spring.

It is preferred that the outer shield be integrally formed with conductive material.

Meanwhile, the camera module for a vehicle according to an exemplary embodiment of the present invention may further include a lens module disposed over the first PCB and configured to transfer an image to the image sensor; and a cover member configured to cover a top of the lens module and the first PCB.

It is preferred that the support units support at least three faces of the first and the second PCBs and space the first and the second PCBs from each other at a specific interval.

Advantageous Effects

According to the present invention, plural sheets of PCBs can be fixed and supported at once with the PCBs spaced apart from each other even without additional spacers and screws.

BEST MODE

Exemplary embodiments of the present invention are described below with reference to the accompanying drawings.

Figure 1:
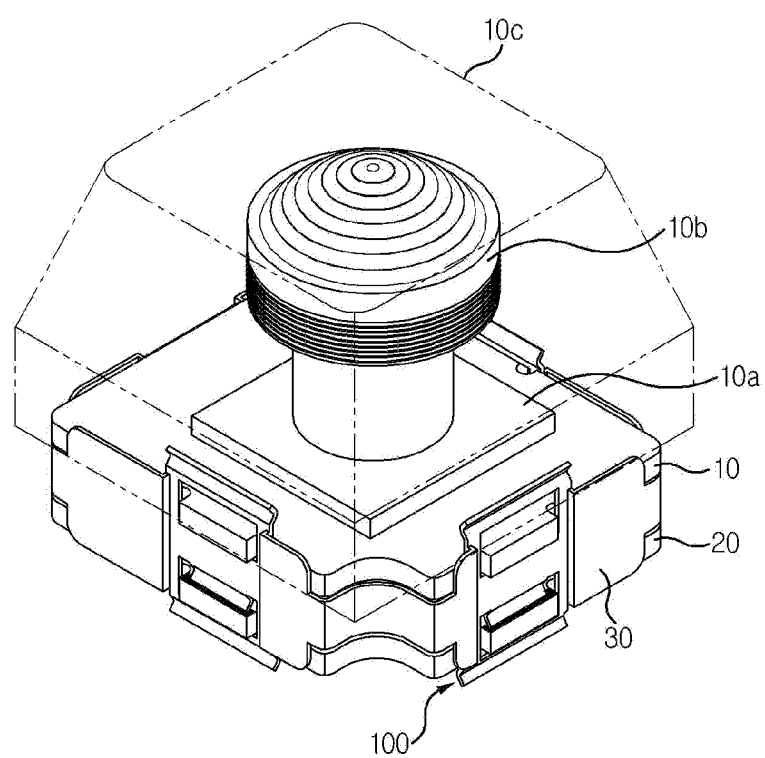
FIG. 1 is a diagram showing an example of a camera module for a vehicle according to an exemplary embodiment of the present invention.
Figure 2:
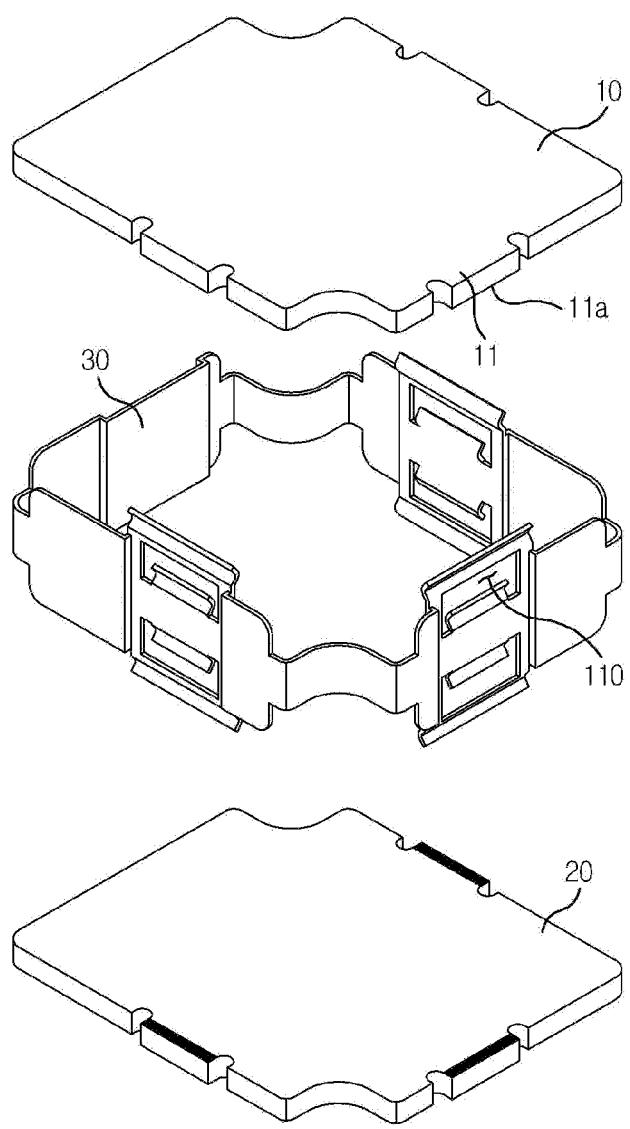
FIG. 2 is an exploded perspective view of first and second PCBs and an outer shield shown in FIG. 1.
Figure 3:
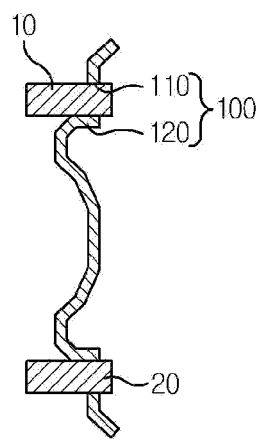
FIG. 3 is a cross-sectional view of FIG. 2.
Figure 4:
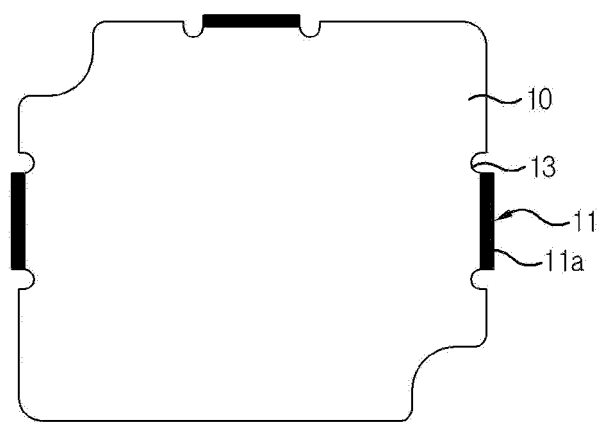
FIG. 4 is a rear view of the first PCB according to an embodiment of the present invention.

FIG. 1 is a diagram showing an example of a camera module for a vehicle according to an exemplary embodiment of the present invention, FIG. 2 is an exploded perspective view of first and second PCBs and an outer shield shown in FIG. 1, FIG. 3 is a cross-sectional view of FIG. 2, and FIG. 4 is a rear view of the first PCB according to an embodiment of the present invention.

As shown, the camera module for a vehicle according to the exemplary embodiment of the present invention includes a first PCB 10, a second PCB 20, an outer shield 30, and support units 100.

The first PCB 10 has an image sensor 10a mounted on its top surface and configured to sense external image information. The second PCB 20 is spaced apart from the first PCB 10 at a specific interval and is disposed at the bottom of the first PCB 10. It is preferred that the second PCB 20 be disposed in a module for supplying a power source to the first PCB 10.

Meanwhile, the camera module for a vehicle according to the exemplary embodiment of the present invention may further include a lens module 10b disposed over the first PCB 10 and configured to transfer an image to the image sensor 10a and a cover member 10c configured to cover the upper side of the image sensor 10a, the lens module 10b, and the first PCB 10, as shown in FIG. 1. The elements may be changed according to a construction.

The outer shield 30 is formed to surround the side of the first and the second PCBs 10 and 20 and configured to shield the first and the second PCBs 10 and 20 from electromagnetic interference (EMI). To this end, it is preferred that the sidewall face of the outer shield 30 be configured to have a value greater than the sum of the thickness of the first and the second PCBs 10 and 20 and an interval between the first and the second PCBs 10 and 20, as shown in FIGS. 1 and 2.

It is also preferred that the outer shield 30 be formed of one body made of conductive metal material. The outer shield 30 may inhibit a malfunction of the camera module due to a disturbance of external electromagnetic waves and the influence of electromagnetic waves, occurring when the camera is operated, on peripheral parts by absorbing electromagnetic waves generated from the first and the second PCBs 10 and 20 and electromagnetic waves induced from the outside to the first and the second PCBs 10 and 20.

It is preferred that the support units 100 be integrally formed with the outer shield 30 and placed at positions where the support units 100 interfere with the first and the second PCBs 10 and 20. The support units 100 support the first and the second PCBs 10 and 20. It is preferred that a plurality of the support units 100 be provided in the circumference of the first and the second PCBs 10 and 20, as shown in FIG. 2.

Each of the support units 100 includes a through hole 110 and a tension spring 120.

The through hole 110 is formed to penetrate the outer shield 30, formed in the surface of a wall of the outer shield 30, and configured to accommodate a support protrusion 11 protruded from the side of the first and the second PCBs 10 and 20. The support protrusion 11 is formed approximately at the central part of the circumferential face of each of the first and the second PCBs 10 and 20. As shown in FIG. 4, concave grooves 13 having a specific depth are formed in the circumferential face of each of the first and the second PCBs 10 and 20 so that the support protrusion 11 has a protruding shape different from other peripheral circumferential faces.

The tension spring 120 is formed by partially bending the sidewall face of the outer shield 30. The tension spring 120 is disposed to face the support protrusion 11 passing through the through hole 110, thus elastically supporting the face where the tension spring 120 faces the support protrusion 11.

Furthermore, it is preferred that each of pairs of the support units 100 be symmetrically disposed on the sidewall face of the outer shield 30 up and down so that the pair of support units 100 support the first and the second PCBs 10 and 20 at the same time with the first and the second PCBs 10 and 20 spaced apart at a specific interval, as shown in FIGS. 2 and 3.

Meanwhile, it is preferred that the support protrusion 11 include a ground terminal unit 11a plated with conductive material and formed at a position where the support protrusion 11 interferes with the tension spring 120. The ground terminal unit 11a is connected to the outer shield 30 made of the metal material so that the ground terminal unit 11a may conduct electricity to the outer shield 30. Accordingly, electromagnetic waves and remaining electricity generated from the first and the second PCBs 10 and 20 may be grounded through the outer shield 30.

It is preferred that the support units 100 constructed as described above support at least three faces of the first and the second PCBs 10 and 20, as shown in FIGS. 2 and 3. Accordingly, the first and the second PCBs 10 and 20 can be spaced apart from each other at a specific interval or more even without additional spacers.

Furthermore, as shown in FIG. 3, the first and the second PCBs 10 and 20 may be spaced apart from each other by the length of the tension springs 120 because they are supported over and under the plural pairs of tension springs 120. Accordingly, the first and the second PCBs 10 and 20 can be spaced apart from each other at a specific interval even without using parts, such as additional spacers.

The embodiments of the present invention described above and shown in the drawings should not be construed as limiting the technical spirit of the present invention. The scope of the present invention is restricted by only the claims, and a person having ordinary skill in the art to which the present invention pertains may improve and modify the technical spirit of the present invention in various forms. Accordingly, the modifications and modifications will fall within the scope of the present invention as long as they are evident to those skilled in the art.

INDUSTRIAL APPLICABILITY

A camera module for a vehicle according to the present invention may be used as a camera module for monitoring the front and rear of a vehicle.

The invention claimed is:

1. A camera module, comprising:
  a first PCB (printed circuit board) including a first protrusion and a first ground part formed on a surface of the first protrusion;
  a second PCB including a second protrusion and a second ground part formed on a surface of the second protrusion; and
  an outer shield supporting the first PCB and the second PCB,
  wherein the outer shield comprises a plurality of sidewalls including a first sidewall, a second sidewall, and a third sidewall,
  wherein each of the first sidewall, the second sidewall, and the third sidewall comprises a first hole, a first tension spring bent from the first hole, a second hole, and a second tension spring bent from the second hole,
  wherein the first protrusion is coupled to the first hole of the first sidewall, wherein the second protrusion is coupled to the second hole of the first sidewall, wherein the first tension spring of the first sidewall is in physical contact with the first ground part, and wherein the second tension spring of the first sidewall is in physical contact with the second ground part.

2. The camera module of claim 1, wherein the first ground part and the second ground part are respectively disposed on one of a side surface, an upper surface, and a lower surface of the first PCB and the second PCB.

3. The camera module of claim 2, wherein a plurality of the first ground part and the second ground part are provided along a circumference of the first PCB and the second PCB, respectively.

4. The camera module of claim 1, comprising:

a lens module disposed over the first PCB and configured to transfer an image to the image sensor; and a cover member configured to cover a top of the lens module and the first PCB.

5. The camera module of claim 1, wherein the outer shield supports at least three surfaces of the first and second PCBs.

6. The camera module of claim 1, wherein the outer shield is electrically connected to the first and second ground parts, and the first and second PCBs are grounded through the outer shield.

7. The camera module of claim 1, wherein the outer shield has a sidewall surface greater than a sum of thicknesses of the first and second PCBs and a spacing therebetween.

8. The camera module of claim 1, wherein a distance between the first PCB and the second PCB is determined by the first tension spring and the second tension spring of each of the first sidewall, the second sidewall, and the third sidewall.

9. The camera module of claim 1, wherein a distance between the first PCB and the second PCB is determined by a distance between the first tension spring and the second tension spring of each of the first sidewall, the second sidewall, and the third sidewall.

10. The camera module of claim 1, wherein the first tension spring and the second tension spring of each of the first sidewall, the second sidewall, and the third sidewall are formed monolithically with a remainder of the respective sidewall.

11. A vehicle comprising the camera module of claim 1.

* * * * *